US010447549B2

(12) United States Patent
Tang et al.

(10) Patent No.: US 10,447,549 B2
(45) Date of Patent: Oct. 15, 2019

(54) NEIGHBOR ESTABLISHMENT METHOD AND SYSTEM, AND DEVICE

(71) Applicant: Huawei Technologies Co., Ltd., Shenzhen (CN)

(72) Inventors: Zhiyu Tang, Beijing (CN); Wenxia Hou, Shenzhen (CN); Xudong Zhang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/881,965

(22) Filed: Jan. 29, 2018

(65) Prior Publication Data
US 2018/0152355 A1 May 31, 2018

Related U.S. Application Data

(63) Continuation of application No. PCT/CN2015/085431, filed on Jul. 29, 2015.

(51) Int. Cl.
H04L 29/04 (2006.01)
H04L 12/24 (2006.01)
(Continued)

(52) U.S. Cl.
CPC ............ H04L 41/12 (2013.01); H04L 29/04 (2013.01); H04L 43/10 (2013.01); H04L 45/026 (2013.01);
(Continued)

(58) Field of Classification Search
CPC ......... H04L 41/12; H04L 29/04; H04L 43/10; H04L 45/026; H04L 43/0869; H04L 67/104
(Continued)

(56) References Cited

U.S. PATENT DOCUMENTS 8,848,515 B2 * 9/2014 Wen .................... H04L 12/4637
370/222
2003/0149869 A1 * 8/2003 Gleichauf ............... H04L 45/50
713/153
(Continued)

FOREIGN PATENT DOCUMENTS

CN 101426004 A 5/2009
CN 101431471 A 5/2009
(Continued)

OTHER PUBLICATIONS

Machine Translation and Abstract of Chinese Publication No. CN101431471, May 13, 2009, 16 pages.
(Continued)

Primary Examiner — Phong La
(74) Attorney, Agent, or Firm — Conley Rose, P.C.

(57) ABSTRACT

A method for establishing a neighbor relationship, where corresponding authentication information is added to packets that are sent from a first network device and a second network device to each other. The first network device sends a hello packet to the second network device. The second network device receives the hello packet, performs authentication, and responds to the hello packet using an extended unidirectional link (UDL) link state packet (LSP) when the authentication succeeds. The first network device receives the extended UDL LSP, and performs authentication. When an authentication result includes that both the first network device and the second network device enable authentication and the authentication succeeds, a neighbor relationship between the first network device and the second network device may be established.

18 Claims, 6 Drawing Sheets

(51) Int. Cl.
*H04L 12/26* (2006.01)
*H04L 29/06* (2006.01)
*H04L 12/751* (2013.01)
*H04L 29/08* (2006.01)

(52) U.S. Cl.
CPC ........ *H04L 63/0869* (2013.01); *H04L 67/104* (2013.01)

(58) Field of Classification Search
USPC .......................................................... 370/254
See application file for complete search history.

(56) References Cited

U.S. PATENT DOCUMENTS

| | | | |
|---|---|---|---|
| 2003/0179742 A1* | 9/2003 | Ogier | H04L 1/1614 370/351 |
| 2005/0152379 A1* | 7/2005 | Hall | H04L 12/437 370/400 |
| 2006/0146696 A1* | 7/2006 | Li | H04L 41/06 370/218 |
| 2006/0209719 A1 | 9/2006 | Previdi et al. | |
| 2007/0115989 A1* | 5/2007 | Mirtorabi | H04L 45/02 370/392 |
| 2008/0037436 A1* | 2/2008 | Liu | H04L 12/4633 370/250 |
| 2008/0144668 A1* | 6/2008 | Hall | H04J 3/0652 370/503 |
| 2009/0086653 A1* | 4/2009 | Driscoll | H04L 12/42 370/258 |
| 2009/0201832 A1 | 8/2009 | Brown | |
| 2010/0217882 A1 | 8/2010 | Yang | |
| 2012/0233529 A1* | 9/2012 | Bascom | G06F 16/288 715/205 |
| 2013/0128771 A1* | 5/2013 | Wen | H04L 12/4637 370/254 |
| 2013/0318570 A1 | 11/2013 | L et al. | |
| 2014/0211615 A1* | 7/2014 | Murphy | H04L 12/28 370/228 |
| 2014/0313939 A1 | 10/2014 | Saltsidis | |
| 2015/0207729 A1* | 7/2015 | Gagliano | H04L 67/2819 370/254 |
| 2015/0229550 A1* | 8/2015 | Addeo | H04L 43/10 709/224 |
| 2016/0006837 A1* | 1/2016 | Reynolds | H04W 84/18 709/203 |
| 2016/0087933 A1* | 3/2016 | Johnson | H04W 4/70 709/245 |
| 2016/0094398 A1* | 3/2016 | Choudhury | H04L 45/42 370/254 |
| 2019/0028327 A1* | 1/2019 | Silva | H04L 43/0811 |

FOREIGN PATENT DOCUMENTS

| | | |
|---|---|---|
| CN | 102480429 A | 5/2012 |
| CN | 103095563 A | 5/2013 |
| CN | 104335546 A | 2/2015 |

OTHER PUBLICATIONS

Machine Translation and Abstract of Chinese Publication No. CN102480429, May 30, 2012, 17 pages.
Ginsberg, L., et al., "IS-IS Support for Unidirectional Links," draft-ietf-isis-ud1-01.txt, Oct. 16, 2013, 20 pages.
Foreign Communication From a Counterpart Application, PCT Application No. PCT/CN2015/085431, International Search Report dated Apr. 29, 2016, 2 pages.
Foreign Communication From a Counterpart Application, PCT Application No. PCT/CN2015/085431, Written Opinion dated Apr. 29, 2016, 6 pages.
Ginsberg, L., et al, "IS-IS Support for Unidirectional Links," draft-ietf-isis-ud1-02.txt, XP015099857, Jun. 28, 2014, 19 pages.
Foreign Communication From a Counterpart Application, European Application No. 15899251.1, Extended European Search Report dated Jun. 18, 2018, 7 pages.
Machine Translation and Abstract of Chinese Publication No. CN103095563, May 8, 2013, 27 pages.
Foreign Communication From a Counterpart Application, Chinese Application No. 201580062748.7, Chinese Office Action dated May 27, 2019, 5 pages.

* cited by examiner

| | No. of octets |
|---|---|
| Type | 1 |
| Length | 1 |
| Neighbor LAN ID | ID Length + 1 |
| Authentication Type | 1 |
| Authentication Value | Length reserved |

FIG. 5

| | No. of octets |
|---|---|
| Type | 1 |
| Length | 1 |
| Extended Local Circuit ID | 4 |
| Authentication Type | 1 |
| Authentication Value | Length reserved |

FIG. 6

NEIGHBOR ESTABLISHMENT METHOD AND SYSTEM, AND DEVICE

CROSS-REFERENCE TO RELATED APPLICATION

This application is a continuation of International Patent Application No. PCT/CN2015/085431 filed on Jul. 29, 2015, which is hereby incorporated by reference in its entirety.

TECHNICAL FIELD

The present disclosure relates to the field of computer network technologies, and in particular, to a neighbor establishment method and system, and a device.

BACKGROUND

The intermediate system-to-intermediate system (ISIS) protocol is a conventional link state protocol. Based on the ISIS protocol, a neighbor relationship between devices is established and maintained using a hello packet. In a neighbor relationship establishment process to avoid a malicious attack, an authentication mechanism is used for an ISIS packet. When authentication is enabled, two parties that establish a neighbor relationship need to add, into a hello packet, type-length-value (TLV) used for authentication, and are allowed to establish an ISIS neighbor after the authentication succeeds.

Generally, two network devices in an ISIS network are in a bidirectional connection. In some scenarios, if a physical link in one direction is not connected, the network devices are in a unidirectional connection. This scenario is defined in a unidirectional ISIS protocol. In this case, if there is another indirect path between the network devices, neighbor information may be transmitted on the indirect path such that the two network devices are allowed to continue to establish and maintain a neighbor relationship. However, when one of the two network devices that are connected using a unidirectional link (UDL) enables an authentication function while the other one does not enable an authentication function, a neighbor relationship is still normally established. In this way, a security risk between neighbors is brought.

SUMMARY

In view of this, embodiments of the present disclosure provide a neighbor establishment method and system, and a device in order to resolve a problem of a security risk between neighbors that is caused by incomplete authentication when a neighbor between network devices is established in a UDL case.

To achieve the foregoing objective, the embodiments of the present disclosure provide the following technical solutions.

A first aspect of the embodiments of the present disclosure discloses a neighbor establishment method, where the method includes sending, by a first network device, a hello packet to a second network device using a first UDL, where the hello packet carries first authentication information used to authenticate the first network device, and the first UDL is a direct link from the first network device to the second network device, receiving, by the first network device, an extended UDL link state packet (LSP) from the second network device using a second UDL, where the extended UDL LSP is used to respond to the hello packet, when the second network device enables authentication, the extended UDL LSP carries second authentication information used to authenticate the second network device, and the second UDL is an indirect link from the second network device to the first network device, and authenticating, by the first network device, the extended UDL LSP, and when an authentication result is that both the first network device and the second network device enable authentication and the authentication succeeds, establishing, by the first network device, a neighbor relationship with the second network device.

In a first implementation of the first aspect of the embodiments of the present disclosure, authenticating, by the first network device, the extended UDL LSP includes extracting, by the first network device for authentication, the second authentication information that is carried in the extended UDL LSP and used to authenticate the second network device, and obtaining the authentication result that both the first network device and the second network device enable the authentication and the authentication succeeds when the authentication is valid.

In a second implementation of the first aspect of the embodiments of the present disclosure, after sending, by a first network device, a hello packet to a second network device using a first UDL, the method further includes receiving, by the first network device, a UDL LSP from the second network device using the second UDL when the second network device does not enable the authentication, where the UDL LSP is used to respond to the hello packet, the UDL LSP does not carry the second authentication information used to authenticate the second network device, and the second UDL is the indirect link from the second network device to the first network device, authenticating, by the first network device, the UDL LSP, and skipping establishing the neighbor relationship with the second network device when not detecting that the UDL LSP carries the second authentication information used to authenticate the second network device.

In a third implementation of the first aspect of the embodiments of the present disclosure, the second authentication information used to authenticate the second network device includes authentication information of a broadcasting network or authentication information of a peer-to-peer (P2P) network. A format of the authentication information of the broadcasting network successively includes the fields, a type field used to store a packet type, a length field used to store a packet length, an extended local circuit identifier (ID) field used to store an extended local circuit ID, an authentication type field used to store an authentication type, and an authentication value field used to store an authentication value authentication value, and a format of the authentication information of the P2P successively includes the fields, a type field used to store a packet type, a length field used to store a packet length, a neighbor local area network (LAN) ID field used to store a neighbor LAN ID, an authentication type field used to store an authentication type, and an authentication value field used to store an authentication value authentication value.

A second aspect of the embodiments of the present disclosure discloses a network device, used as a first network device, and including a communications unit configured to send a hello packet to a second network device using a first UDL, where the hello packet carries first authentication information used to authenticate the first network device, and receive an extended UDL LSP from the second network device using a second UDL, where the extended UDL LSP is used to respond to the hello packet, when the second network device enables authentication, the extended UDL LSP carries second authentication information used to authenticate the second network device, the first UDL is a direct link from the first network device to the second network device, and the second UDL is an indirect link from the second network device to the first network device, and a processor configured to authenticate the extended UDL LSP, and establish a neighbor relationship between the first network device and the second network device when an authentication result is that both the first network device and the second network device enable authentication and the authentication succeeds.

In a first implementation of the second aspect of the embodiments of the present disclosure, the processor is configured to extract, for authentication, the second authentication information that is carried in the extended UDL LSP and used to authenticate the second network device, and obtain the authentication result that both the first network device and the second network device enable the authentication and the authentication succeeds when the authentication is valid.

In a second implementation of the second aspect of the embodiments of the present disclosure, when the second network device does not enable the authentication, the communications unit is configured to receive a UDL LSP from the second network device using the second UDL, where the UDL LSP is used to respond to the hello packet, the UDL LSP does not carry the second authentication information used to authenticate the second network device, and the second UDL is the indirect link from the second network device to the first network device, and the processor is configured to authenticate the UDL LSP, and not establish the neighbor relationship with the second network device when it is not detected that the UDL LSP carries the second authentication information used to authenticate the second network device.

A third aspect of the embodiments of the present disclosure discloses a neighbor establishment method, where the method includes receiving, by a second network device, a hello packet from a first network device using a first UDL, where the hello packet carries first authentication information used to authenticate the first network device, and the first UDL is a direct link from the first network device to the second network device, and receiving, by the second network device, the hello packet using the first UDL, and performing authentication when the second network device enables authentication, sending an extended UDL LSP to the first network device using a second UDL when the authentication succeeds, where the extended UDL LSP is used to respond to the hello packet, the extended UDL LSP carries second authentication information used to authenticate the second network device, and the first network device authenticates the extended UDL LSP, and establishing a neighbor relationship with the first network device when an authentication result is that both the first network device and the second network device enable authentication and the authentication succeeds, where the second UDL is an indirect link from the second network device to the first network device.

In a first implementation of the third aspect of the embodiments of the present disclosure, the method further includes sending, by the second network device, a UDL LSP to the first network device using the second UDL when the second network device does not enable the authentication, where the UDL LSP does not carry the second authentication information used to authenticate the second network device, and the first network device authenticates the UDL LSP, and skipping establishing the neighbor relationship with the first network device when the first network device does not detect that the UDL LSP carries the second authentication information used to authenticate the second network device.

In a second implementation of the third aspect of the embodiments of the present disclosure, when the second network device enables authentication, receiving, by the second network device, the hello packet using the first UDL, and performing authentication includes receiving, by the second network device using the first UDL, the hello packet that carries the first authentication information used to authenticate the first network device, extracting the first authentication information, and authenticating the hello packet, and confirming that the authentication succeeds when the authentication is valid, or confirming that the authentication does not succeed, and skipping establishing the neighbor relationship with the first network device when the authentication is invalid.

In a third implementation of the third aspect of the embodiments of the present disclosure, when the second network device enables authentication, and the first network device does not enable authentication, the method further includes receiving, by the second network device using the first UDL, a hello packet that is sent by the first network device and does not carry the first authentication information used to authenticate the first network device, and performing authentication, and confirming that the authentication does not succeed, and discarding the hello packet when not extracting the first authentication information.

In a fourth implementation of the third aspect of the embodiments of the present disclosure, sending an extended UDL LSP to the first network device using a second UDL, where the extended UDL LSP is used to respond to the hello packet, and the extended UDL LSP carries second authentication information used to authenticate the second network device includes adding, by the second network device, the second authentication information to the extended UDL LSP, and sending the extended UDL LSP to the first network device using the second UDL, or adding, by the second network device, the second authentication information to the extended UDL LSP in an encryption manner, and sending the extended UDL LSP to the first network device using the second UDL.

In a fifth implementation of the third aspect of the embodiments of the present disclosure, the second authentication information of the second network device includes authentication information of a broadcasting network or authentication information of a P2P network, a format of the authentication information of the broadcasting network successively includes the fields a type field used to store a packet type, a length field used to store a packet length, an extended local circuit ID field used to store an extended local circuit ID, an authentication type field used to store an authentication type, and an authentication value field used to store an authentication value authentication value, and a format of the authentication information of the P2P successively includes the fields a type field used to store a packet type, a length field used to store a packet length, a neighbor LAN ID field used to store a neighbor LAN ID, an authentication type field used to store an authentication type, and an authentication value field used to store an authentication value authentication value.

A fourth aspect of the embodiments of the present disclosure discloses a network device, used as a second network device, and including a communications unit configured to receive a hello packet from a first network device using a first UDL, where the hello packet carries first authentication information used to authenticate the first network device, and the first UDL is a direct link from the first network device to the second network device, and a processor configured to authenticate the hello packet that carries the first authentication information used to authenticate the first network device when the second network device enables authentication, send an extended UDL LSP to the first network device using a second UDL when the authentication succeeds, where the extended UDL LSP is used to respond to the hello packet, the extended UDL LSP carries second authentication information used to authenticate the second network device, and the first network device authenticates the extended UDL LSP, and establish a neighbor relationship with the first network device when an authentication result is that both the first network device and the second network device enable authentication and the authentication succeeds, where the second UDL is an indirect link from the second network device to the first network device.

In a first implementation of the fourth aspect of the embodiments of the present disclosure, when the second network device does not enable the authentication, the processor is configured to send a UDL LSP to the first network device using the second UDL, where the UDL LSP does not carry the second authentication information used to authenticate the second network device, and the first network device authenticates the UDL LSP, and not establish the neighbor relationship with the first network device when the first network device does not detect that the UDL LSP carries the second authentication information used to authenticate the second network device.

In a second implementation of the fourth aspect of the embodiments of the present disclosure, the processor is configured to extract the first authentication information in the hello packet that carries the first authentication information used to authenticate the first network device, and authenticate the hello packet using the first authentication information, and confirm that the authentication succeeds when the authentication is valid, or confirm that the authentication does not succeed, and not establish the neighbor relationship with the first network device when the authentication is invalid.

In a third implementation of the fourth aspect of the embodiments of the present disclosure, when the second network device enables authentication, and the first network device does not enable authentication, the communications unit is configured to receive, using the first UDL, a hello packet sent by the first network device, where the hello packet does not carry the first authentication information used to authenticate the first network device, and the first UDL is the direct link from the first network device to the second network device, and the processor is configured to authenticate the hello packet that does not carry the first authentication information used to authenticate the first network device, and confirm that the authentication does not succeed, and discard the hello packet when not extracting the first authentication information.

In a fourth implementation of the fourth aspect of the embodiments of the present disclosure, the extended UDL LSP is used to respond to the hello packet, the extended UDL LSP carries the second authentication information used to authenticate the second network device, and sending the extended UDL LSP to the first network device using the second UDL, the processor is configured to add the second authentication information to the extended UDL LSP, and send the extended UDL LSP to the first network device using the second UDL, or add the second authentication information to the extended UDL LSP in an encryption manner, and send the extended UDL LSP to the first network device using the second UDL.

A fifth aspect of the embodiments of the present disclosure discloses a neighbor establishment system, and the system includes the network device used as a first network device disclosed in the second aspect of the embodiments of the present disclosure, the network device used as a second network device disclosed in the fourth aspect of the embodiments of the present disclosure, and a physical link connecting the first network device and the second network device, where the physical link includes a first UDL from the first network device to the second network device and a second UDL from the second network device to the first network device, the first UDL is a direct link, and the second UDL is an indirect link.

It can be learned from the foregoing technical solutions that, compared with the other approaches, the embodiments of the present disclosure disclose a neighbor establishment method and system, and a device. When it is detected, using a link status, that a physical link at one end is in a disconnected state, behavior when two parties that establish a neighbor are in a UDL scenario is stipulated. According to the method, corresponding authentication information is added, according to whether a first network device and a second network device enable authentication, to packets that are sent by the first network device and the second network device to each other. If both the first network device and the second network device enable authentication, the first network device sends a hello packet to the second network device, and the second network device receives the hello packet and performs authentication. After the authentication succeeds, the second network device responds to the hello packet using an extended UDL LSP that carries second authentication information used to authenticate the second network device. Then, the first network device receives the extended UDL LSP and performs authentication. When an authentication result is that both the first network device and the second network device enable authentication and the authentication succeeds, a neighbor relationship between the first network device and the second network device may be established. According to the method disclosed in the embodiments of the present disclosure, a case in which a neighbor relationship may still be established when authentication of only one party succeeds can be avoided. In this way, a problem of incomplete authentication during neighbor establishment is resolved, and security and reliability when a neighbor between network devices is established are improved.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely embodiments of the present disclosure, and a person of ordinary skill in the art may still derive other drawings from these accompanying drawings without creative efforts.

FIG. 5 is a schematic diagram of a format of authentication information of a broadcasting network according to an embodiment of the present disclosure;

FIG. 6 is a schematic diagram of a format of authentication information of a P2P network according to an embodiment of the present disclosure;

DESCRIPTION OF EMBODIMENTS

For reference and clarity, descriptions and acronyms or abbreviations of technical terms used hereinafter are summarized as follows:

ISIS: Intermediate system-to-intermediate system;

UDL: Unidirectional link;

IS-T: IS at a transmit end of a UDL;

IS-R: IS at a receive end of a UDL;

Hello packet: A hello packet is used to establish and maintain an IS-IS neighbor relationship, and a router regularly sends a hello data packet to a neighboring router at a hello time interval;

TLV: TLV frequently used in an ISIS network generally refers to an optional variable-length field of a routing information field. A type field is used to store a packet type, a length field is used to store a packet length, lengths of the type field and the length field are generally fixed, a value field is used to store specific content of a packet, a length of the value field is variable, and the value field may include one or more fields of a TLV type;

SUB TLV: A value field of TLV may be divided into subtype fields, subtype value length fields, and subtype value fields according to a similar format, the sub type fields, the sub value length fields, and the sub value fields are referred to as SUB TLV fields. The sub type field indicates a type of the sub value field, the sub value length field indicates a length of the sub value field in a unit of a byte, and the sub value field indicates protocol content of the SUB TLV field;

LSP: link state packet;

UDL TLV: The TLV with UDL information; and

UDL LSP: The LSP with UDL TLV.

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
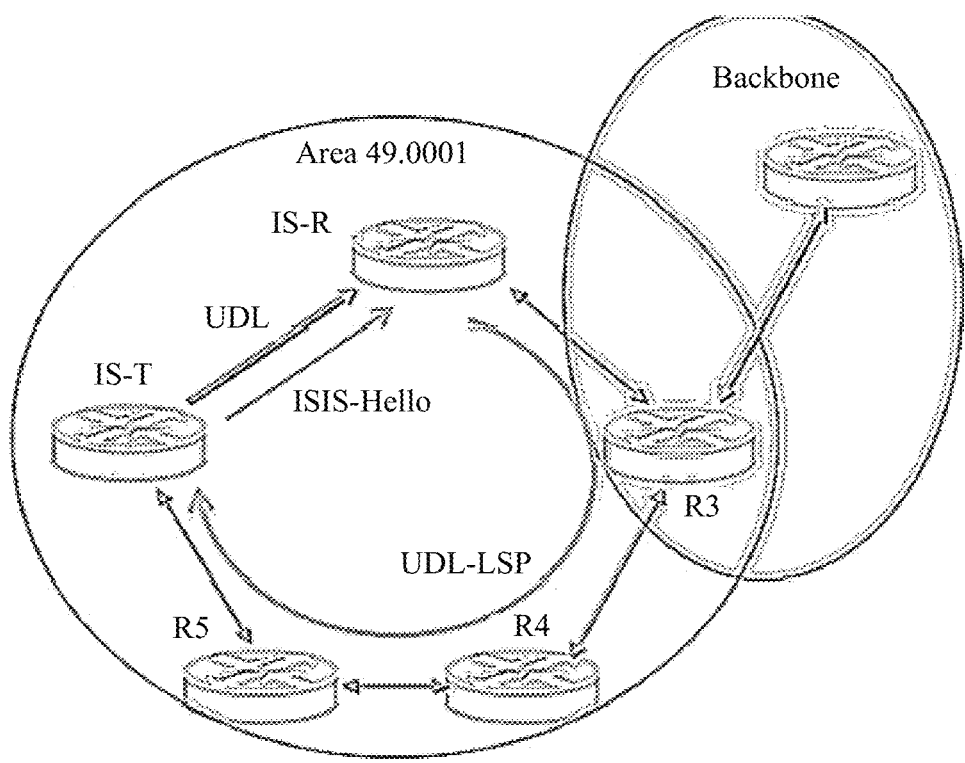
FIG. 1 is a schematic diagram of a physical link through which a neighbor between an intermediate system (IS) at transmit end of a UDL (IS-T) end and an intermediate system at receive end of a UDL (IS-R) end is established.

It may be learned from the background that, in the other approaches, a UDL LSP is defined in a unidirectional ISIS protocol such that the UDL LSP carries neighbor information, and floods the neighbor information of an IS-R to an IS-T using an IS-R end, physical links R3, R4, and R5, and an IS-T end that are shown in FIG. 1. In this way, a neighbor relationship between the IS-T and the IS-R is established. In the other approaches, in a UDL scenario, the UDL LSP floods the carried neighbor information to the IS-T in the IS-R. When the IS-T detects that a current protocol is a unidirectional ISIS protocol, the IS-T checks and authenticates, based on the unidirectional ISIS protocol, only an LSP transmitted in a UDL, and does not further check whether an IS-R port that responds to packet information enables authentication. If the LSP is authenticated, establishment of a neighbor between the IS-T and the IS-R may be allowed.

That is, in the other approaches, in the UDL scenario, when an interface of a UDL at an IS-T end enables authentication while an interface of the UDL at an IS-R end does not enable authentication, establishment of a neighbor between the IS-T and the IS-R that is not allowed originally is still normally performed. In this way, a security risk between neighbors is brought.

Therefore, the embodiments of the present disclosure provide a neighbor establishment method and system, and a device. According to the method disclosed in the embodiments of the present disclosure, corresponding authentication information is added, according to whether a first network device and a second network device enable authentication, to packets that are sent by the first network device and the second network device to each other separately using different UDLs. Therefore, a case in which a neighbor relationship between two parties may still be established when authentication of only one party succeeds can be avoided. In this way, a problem of incomplete authentication during neighbor establishment is resolved, and security and reliability when a neighbor between routers is established are improved. A specific process is described in detail using the following embodiments of the present disclosure.

Embodiment 1

Figure 2:
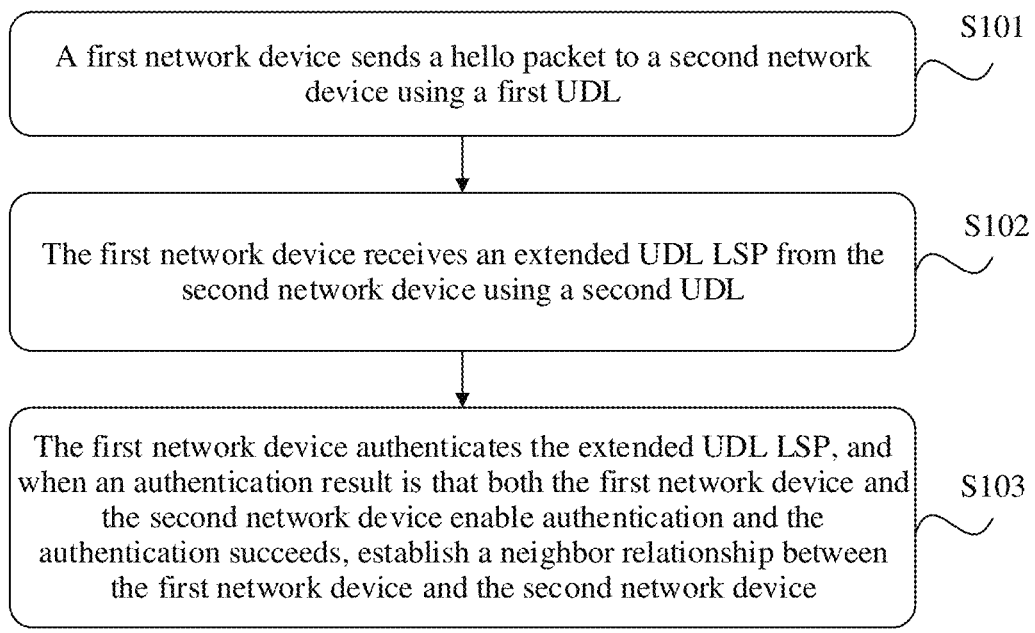
FIG. 2 is a flowchart of a neighbor establishment method according to Embodiment 1 of the present disclosure.

As shown in FIG. 2, FIG. 2 is a flowchart of a neighbor establishment method according to Embodiment 1 of the present disclosure. When two parties that establish a neighbor are in a UDL scenario, the method mainly includes the following steps.

Step S101: A first network device sends a hello packet to a second network device using a first UDL.

In step S101, the first network device sends the hello packet to the second network device using the first UDL, and the hello packet carries first authentication information TLV used to authenticate the first network device. The first UDL is a direct link from the first network device to the second network device.

The first network device and the second network device mentioned in this embodiment of the present disclosure may be network devices such as routers or switches.

Step S102: The first network device receives an extended UDL LSP from the second network device using a second UDL, where the extended UDL LSP is used to respond to the hello packet.

In step S102, the second network device receives the hello packet using the first UDL, and sends to the first network device using the second UDL and according to whether the second network device enables authentication, the UDL LSP used to respond to the hello packet. The second UDL is an indirect link from the second network device to the first network device.

The UDL LSP is a LSP that carries UDL TLV, and includes neighbor information sent to the first network device. The UDL TLV is authentication information TLV that carries UDL information. Whether second authentication information SUB TLV used to authenticate the second network device is added to the UDL TLV is related to whether the second network device enables the authentication.

When the second network device enables the authentication, the second authentication information SUB TLV is added, when the second network device does not enable the authentication, the second authentication information SUB TLV is not added.

That is, in step S102, when the second network device enables the authentication, the UDL LSP that is received by the first network device and sent by the second network device using the second UDL is an extended UDL LSP, and the UDL LSP is used to respond to the hello packet. The extended UDL LSP carries the second authentication information SUB TLV used to authenticate the second network device.

Step S103: The first network device authenticates the extended UDL LSP, and when an authentication result is that both the first network device and the second network device enable authentication and the authentication succeeds, the first network device establishes a neighbor relationship with the second network device.

In step S103, for the obtained authentication result, if the authentication result is that both the first network device and the second network device enable the authentication and the authentication succeeds, the first network device may establish the neighbor relationship with the second network device. A neighbor relationship between two parties is established after the two parties both enable authentication and the authentication succeeds such that a case in which a neighbor relationship between two parties may still be established when only one party enables authentication and the authentication succeeds is avoided. In this way, a problem of incomplete authentication during neighbor establishment is resolved, and security and reliability when a neighbor between network devices is established are improved.

Embodiment 2

Figure 3:
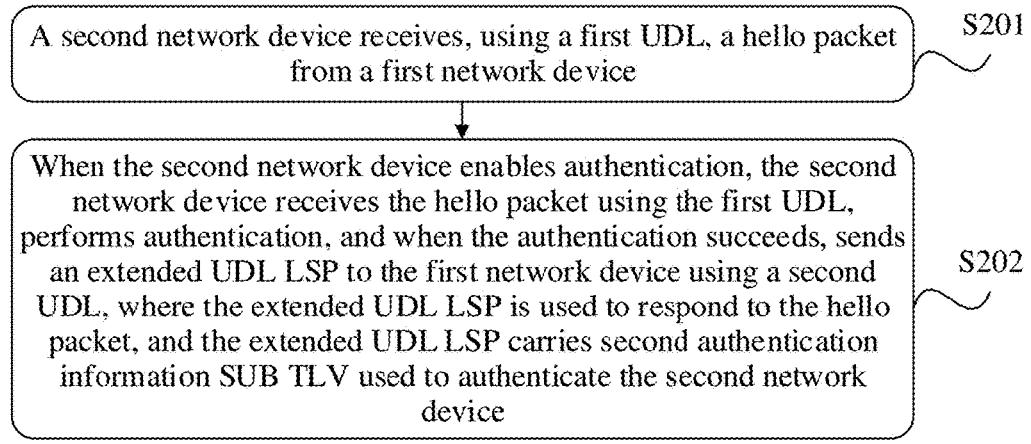
FIG. 3 is a flowchart of a neighbor establishment method according to Embodiment 2 of the present disclosure.

As shown in FIG. 3, FIG. 3 is a flowchart of another neighbor establishment method according to Embodiment 2 of the present disclosure. When two parties that establish a neighbor are in a UDL scenario, the method mainly includes the following steps.

Step S201: A second network device receives a hello packet from a first network device using a first UDL, where the hello packet carries first authentication information TLV used to authenticate the first network device.

In step S201, the first UDL is a direct link from the first network device to the second network device.

Step S202: When the second network device enables authentication, the second network device receives the hello packet using the first UDL, performs authentication, and when the authentication succeeds, sends an extended UDL LSP to the first network device using a second UDL, where the extended UDL LSP is used to respond to the hello packet, and the extended UDL LSP carries second authentication information SUB TLV used to authenticate the second network device.

In step S202, after the second network device sends the extended UDL LSP to the first network device using the second UDL, the first network device authenticates the extended UDL LSP. When an authentication result is that both the first network device and the second network device enable authentication and the authentication succeeds, the second network device establishes a neighbor relationship with the first network device.

The second UDL is an indirect link from the second network device to the first network device.

The extended UDL LSP is a LSP that carries a UDL TLV, and includes neighbor information sent to the first network device. The UDL TLV is authentication information TLV that carries UDL information. When the second network device enables the authentication, the second authentication information SUB TLV used to authenticate the second network device is added to the UDL TLV.

According to the neighbor establishment method disclosed in this embodiment of the present disclosure, after a second network device receives a hello packet sent by a first network device using a first UDL, if the second network device has enabled authentication, and confirms that the first network device also enables authentication and the authentication succeeds, the second network device sends, to the first network device using a second UDL, an extended UDL LSP that carries second authentication information SUB TLV of the second network device. The first network authenticates the extended UDL LSP. If an authentication result is that both the first network device and the second network device enable authentication and the authentication succeeds, the second network device may establish a neighbor relationship with the first network device. A neighbor relationship between two parties is established after the two parties both enable authentication and the authentication succeeds such that a case in which a neighbor relationship between two parties may still be established when only one party enables authentication and the authentication succeeds is avoided. In this way, a problem of incomplete authentication during neighbor establishment is resolved, and security and reliability when a neighbor between network devices is established are improved.

Embodiment 3

Figure 4:
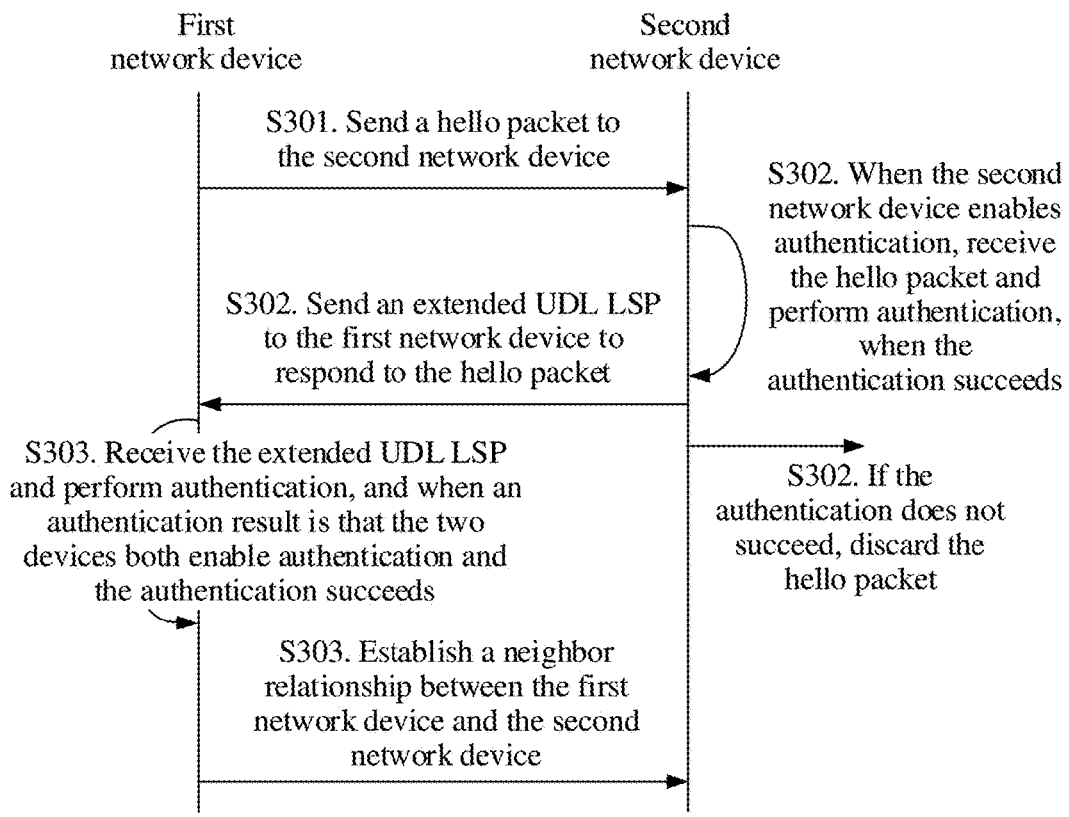
FIG. 4 is a flowchart of a neighbor establishment method according to Embodiment 3 of the present disclosure.

As shown in FIG. 4, FIG. 4 is a flowchart of a neighbor establishment method according to an embodiment of the present disclosure. When two parties that establish a neighbor are in a UDL scenario, the method mainly includes the following steps.

Step S301: A first network device sends a hello packet to a second network device using a first UDL.

In step S301, whether the hello packet sent by the first network device to the second network device using the first UDL carries first authentication information TLV used to authenticate the first network device is associated with whether the first network device enables authentication.

When the first network device enables the authentication, the hello packet is enabled to carry the first authentication information TLV used to authenticate the first network device.

When the first network device does not enable the authentication, the hello packet is enabled not to carry the first authentication information TLV used to authenticate the first network device.

Step S302: When the second network device enables authentication, the second network device receives the hello packet using the first UDL and performs authentication, when the authentication succeeds, the second network device sends an extended UDL LSP to the first network device using a second UDL, where the extended UDL LSP is used to respond to the hello packet, and the extended UDL LSP carries second authentication information used to authenticate the second network device, and when the authentication does not succeed, the second network device discards the hello packet.

In a process of performing step S302, if the second network device enables the authentication, the second network device receives the hello packet and performs authentication. In this authentication process, the second network device extracts the first authentication information TLV, authenticates the entire hello packet, and when the authentication is valid, confirms that the authentication succeeds, and the second network device sends, to the first network device using the second UDL, the extended UDL LSP used to respond to the hello packet. The extended UDL LSP carries the second authentication information SUB TLV used to authenticate the second network device. When the authentication does not succeed, or the second network device does not extract the first authentication information TLV or authenticate the entire hello packet, the second network device directly discards the hello packet, sends no response information to the first network device, and does not establish a neighbor between the second network device and the first network device.

In this case, if not enabling the authentication, the second network device sends a UDL LSP to the first network device using the second UDL. The UDL LSP does not carry the second authentication information SUB TLV used to authenticate the second network device.

In step S302, the UDL LSP is a LSP that carries the UDL TLV, and includes neighbor information sent to the first network device. The UDL TLV is authentication information TLV that carries UDL information. Whether the authentication information SUB TLV used to authenticate the second network device is added to the UDL LSP is associated with whether the second network device enables the authentication. When the second network device enables the authentication, the second authentication information SUB TLV used to authenticate the second network device is added to the UDL TLV such that the UDL LSP is extended to obtain the extended UDL LSP.

When the second network device does not enable the authentication, the second authentication information SUB TLV used to authenticate the second network device is not added to the UDL TLV, and the UDL LSP is not extended.

Step S303: The first network device receives the extended UDL LSP using the second UDL, performs authentication, and when an authentication result is that both the first network device and the second network device enable authentication and the authentication succeeds, establishes a neighbor relationship between the first network device and the second network device.

In step S303, after receiving the extended UDL LSP using the second UDL, the first network device authenticates the extended UDL LSP. In addition to LSP authentication stipulated in a protocol, the UDL TLV also needs to be authenticated. When authentication is enabled, if the first network device authenticates the extended UDL LSP, it is determined that both the first network device and the second network device enable authentication and the authentication succeeds, and the first network device establishes the neighbor relationship with the second network device.

In this authentication process, the second authentication information SUB TLV that is carried in the extended UDL LSP and used to authenticate the second network device is extracted, and the entire UDL TLV is authenticated.

In a process of performing step S303, when both the first network device and the second network device enable authentication and confirm that the authentication succeeds, the first network device and the second network device are allowed to establish the neighbor relationship.

According to the neighbor establishment method disclosed in this embodiment of the present disclosure, corresponding authentication information is added, according to whether a first network device and a second network device enable authentication, to packets that are sent by the first network device and the second network device to each other using different UDLs. Particularly, when it is detected, using a current link status, that a physical link at one end is in a disconnected state, an extended UDL LSP to which second authentication information SUB TLV used to authenticate the second network device is added is used to respond to a hello packet sent by the first network device. In an interaction process in which the first network device and the second network device perform handshake with each other, after receiving the extended UDL LSP, the first network device performs authentication, and when an authentication result is that both the first network device and the second network device enable authentication and the authentication succeeds, establishes a neighbor relationship between the first network device and the second network device. According to the method disclosed in this embodiment of the present disclosure, a case in which a neighbor relationship between two parties may still be established when the two parties enable authentication and authentication of only one party succeeds can be avoided. In this way, a problem of incomplete authentication when a neighbor between network devices is established is resolved, and security and reliability when the neighbor between the network devices is established are improved.

Embodiment 4

Based on a neighbor establishment method disclosed in this embodiment of the present disclosure, in step S301 shown in FIG. 4, a first network device sends a hello packet to a second network device using a first UDL, and whether the hello packet carries first authentication information TLV used to authenticate the first network device is associated with whether the first network device enables authentication. When the first network device sends the hello packet to the second network device, the following situations are included.

In a first situation, when the first network device does not enable authentication, the first network device sends, to the second network device, a hello packet that does not carry the first authentication information TLV used to authenticate the first network device.

In a second situation, when the first network device enables the authentication, the first network device fills authentication enabling information into the first authentication information TLV, and enables the hello packet to carry the first authentication information TLV used to authenticate the first network device. The first network device sends, to the second network device using the first UDL, the hello packet that carries the first authentication information TLV used to authenticate the first network device.

Based on the neighbor establishment method disclosed in Embodiment 4 of the present disclosure, in step S302 shown in FIG. 4, when the second network device enables authentication, the second network device receives the hello packet using the first UDL and performs authentication. When the authentication succeeds, the second network device sends an extended UDL LSP to the first network device using a second UDL, where the extended UDL LSP is used to respond to the hello packet. The extended UDL LSP carries second authentication information used to authenticate the second network device. When the authentication does not succeed, the hello packet is discarded.

When the second network device enables authentication, the second network device sends the extended UDL LSP to the first network device. The extended UDL LSP is used to respond to the hello packet, and the extended UDL LSP carries the second authentication information SUB TLV used to authenticate the second network device. It should be noted herein that the second authentication information SUB TLV is added to the extended UDL LSP in two manners, plaintext and ciphertext.

In a plaintext manner, the authentication enabling information is directly filled into the second authentication information SUB TLV, and the second authentication information SUB TLV is added to UDL TLV. In a ciphertext manner, the authentication enabling information (if a packet needs to be calculated to obtain an encryption value, only an encryption value of UDL TLV is calculated) is filled into the second authentication information SUB TLV, and then the SUB TLV is added to the UDL TLV. Therefore, both the second authentication information SUB TLV used to authenticate the second network device and the authentication enabling information are added to the UDL LSP that carries the UDL TLV, and the extended UDL LSP is formed.

The second network device responds to the hello packet using the extended UDL LSP that carries the second authentication information SUB TLV used to authenticate the second network device. It should be noted that authentication information is added in multiple manners in this embodiment of the present disclosure, and the foregoing content is not intended for limitation. The authentication enabling information obtained by means of calculation and based on the entire UDL TLV may be added to the second authentication information SUB TLV in an encryption manner such as an MD5 or a keychain.

In a specific application process, the second authentication information SUB TLV includes authentication information SUB TLV of a broadcasting network or a P2P network.

A format of the authentication information SUB TLV of the broadcasting network is shown in FIG. 6, and successively includes the fields a field with a one-byte length used to store a packet type, a field with a one-byte length used to store a packet length, a field with a four-byte length used to store an extended local circuit ID, a field with a one-byte length used to store an authentication type, and a field with reserved space used to store an authentication value.

A format of the authentication information SUB TLV of the P2P network is shown in FIG. 5, and successively includes the fields a field with a one-byte length used to store a packet type, a field with a one-byte length used to store a packet length, a field with a length of a sum of an ID length and one-byte used to store a neighbor LAN ID, a field with a one-byte length used to store an authentication type, and a field with reserved space used to store an authentication value.

It should be noted that a quantity of bytes of each field in the authentication information SUB TLV of the broadcasting network and a quantity of bytes of each field in the authentication information SUB TLV of the P2P network are not limited to examples provided in the foregoing embodiment of the present disclosure. Another quantity of bytes may be allocated to each field and the quantity of bytes of each field is not fixed.

For whether the second network device and the first network device enable authentication, and corresponding various processing processes performed by the first network device and the second network device according to respective different authentication enabling statuses in Embodiment 1 of the present disclosure to Embodiment 3 of this application, a neighbor establishment method disclosed in this embodiment of the present disclosure is further described using the following examples and according to respective performing processes in the different authentication enabling statuses of the first network device and the second network device.

Example 1

Figure 7:
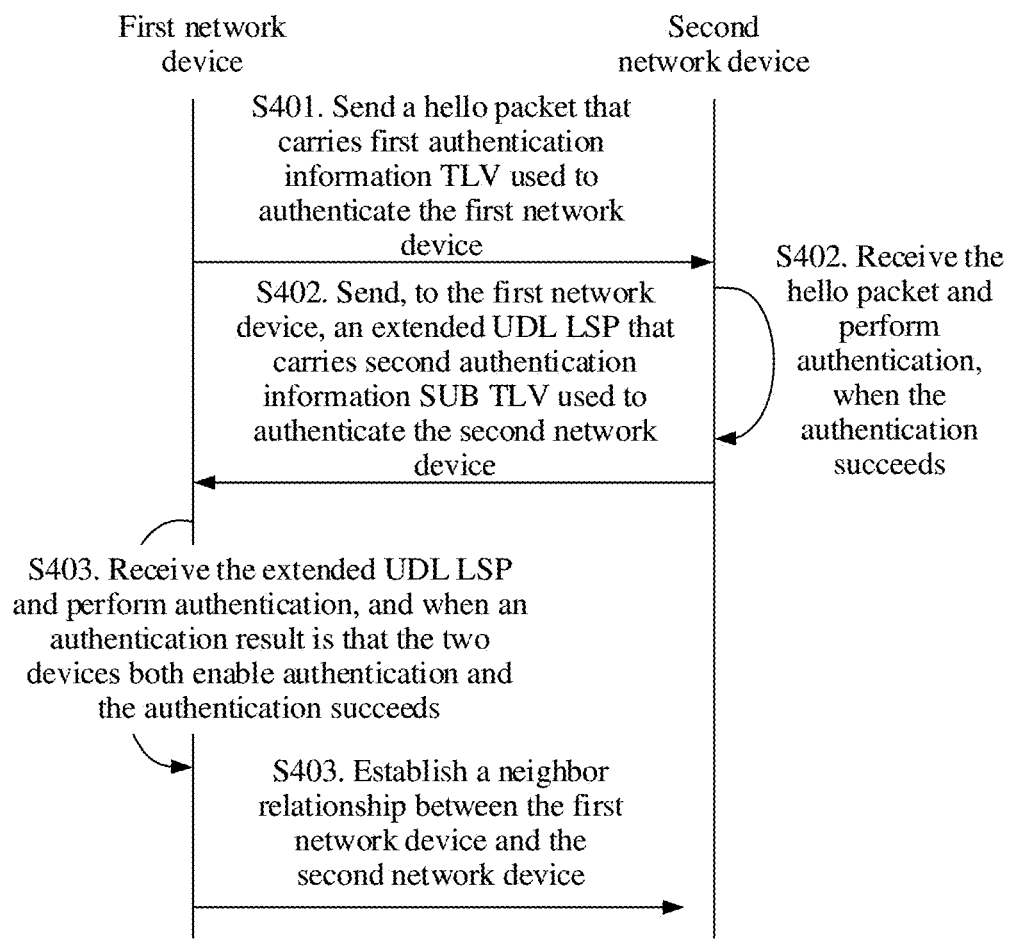
FIG. 7 is a flowchart of a neighbor establishment method according to Example 1 of the present disclosure.

When both the first network device and the second network device enable authentication, a process of establishing a neighbor between the first network device and the second network device is shown in FIG. 7, and mainly includes the following steps.

Step S401: The first network device sends, to the second network device using a first UDL, a hello packet that carries first authentication information TLV used to authenticate the first network device.

The first UDL is a direct link from the first network device to the second network device.

Step S402: The second network device receives, using the first UDL, the hello packet that carries the first authentication information TLV used to authenticate the first network device, and performs authentication, when the authentication succeeds, the second network device sends an extended UDL LSP to the first network device using a second UDL, where the extended UDL LSP carries second authentication information SUB TLV used to authenticate the second network device, and when the authentication does not succeed, the second network device discards the hello packet.

The second UDL is an indirect link from the second network device to the first network device.

In a process of performing step S402, the second network device receives, using the first UDL, the hello packet that carries the first authentication information TLV used to authenticate the first network device, and performs authentication. In an authentication process, the second network device extracts the first authentication information TLV, and authenticates the entire hello packet, and confirms that the authentication succeeds when the authentication is valid, or confirms that the authentication does not succeed, and does not establish a neighbor relationship with the first network device when the authentication is invalid.

After the authentication succeeds, the second network device sends the extended UDL LSP to the first network device using the second UDL. The extended UDL LSP is used to respond to the hello packet, and the extended UDL LSP carries the second authentication information used to authenticate the second network device.

It should be noted that the first network device enables authentication in this example. However, there is also masquerading authentication information currently. In this case, the entire hello packet cannot be authenticated using the masquerading authentication information. Therefore, when enabling authentication, the second network device still needs to discard the hello packet. This is not further described in this embodiment of the present disclosure. This embodiment of the present disclosure focuses on a case in which both the first network device and the second network device correctly enable authentication.

Step S403: The first network device receives, using the second UDL, the extended UDL LSP that carries the second authentication information SUB TLV used to authenticate the second network device, and performs authentication, and when the authentication is valid, the first network device confirms that the authentication succeeds, and establishes a neighbor relationship with the second network device.

In a process of performing step S403, the first network device extracts a UDL TLV carried in the extended UDL LSP, and authenticates the entire UDL TLV using the second authentication information SUB TLV that is added to the UDL TLV. When both the first network device and the second network device enable authentication, if the authentication succeeds, the first network device establishes the neighbor relationship with the second network device.

According to the neighbor establishment method disclosed in Example 1, when both the first network device and the second network device enable authentication, corresponding authentication information is added to packets that are sent by the first network device and the second network device to each other. The second network device receives, using a first UDL, a hello packet that carries first authentication information TLV used to authenticate the first network device, performs authentication, and when the authentication succeeds, responds to the hello packet using an extended UDL LSP that carries second authentication information SUB TLV used to authenticate the second network device. In an interaction process in which the first network device and the second network device perform handshake with each other, the first network device authenticates the received extended UDL LSP, and when an authentication result is that both the first network device and the second network device enable authentication and the authentication succeeds, establishes a neighbor relationship between the first network device and the second network device.

According to the foregoing method disclosed in this example, when the two parties both enable authentication, the extended UDL LSP carries the second authentication information SUB TLV used to authenticate the second network device. After the authentication succeeds, the neighbor relationship between the first network device and the second network device is established. Therefore, when two parties both enable authentication, a case in which a neighbor relationship between the two parties may still be established when authentication of only one party succeeds can be avoided. In this way, a problem of incomplete authentication when a neighbor between network devices is established is resolved, and security and reliability when the neighbor between the network devices is established are improved.

Example 2

Figure 8:
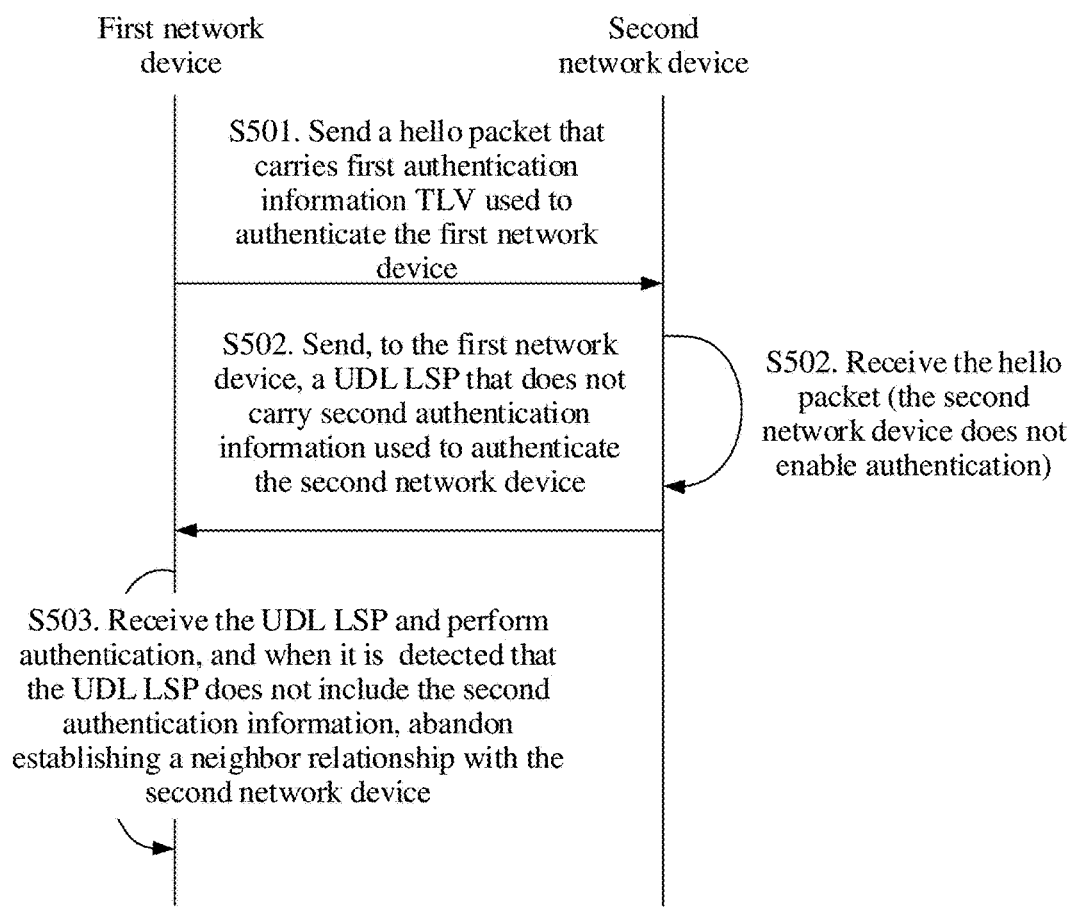
FIG. 8 is a flowchart of a neighbor establishment method according to Example 2 of the present disclosure.

When the first network device enables authentication, and the second network device does not enable authentication, a process of establishing a neighbor between the first network device and the second network device is shown in FIG. 8, and mainly includes the following steps.

Step S501: The first network device sends, to the second network device using a first UDL, a hello packet that carries first authentication information TLV used to authenticate the first network device.

Step S502: The second network device receives, using the first UDL, the hello packet that carries the first authentication information TLV used to authenticate the first network device, and sends a UDL LSP to the first network device using a second UDL, where the UDL LSP does not carry second authentication information used to authenticate the second network device.

In step S502, the second network device does not enable the authentication. Therefore, when responding to the hello packet that is sent by the first network device and carries the first authentication information TLV used to authenticate the first network device, the second network device does not add the second authentication information SUB TLV used to authenticate the second network device to UDL TLV, and does not extend the UDL LSP. That is, in this case, the second authentication information SUB TLV used to authenticate the second network device is not added to the UDL LSP.

Step S503: The first network device receives, using the second UDL, the UDL LSP that does not carry the second authentication information SUB TLV used to authenticate the second network device, performs authentication, and when not detecting that the UDL LSP carries the second authentication information used to authenticate the second network device, does not establish a neighbor relationship with the second network device.

In a process of performing step S503, the first network device receives the UDL LSP using the second UDL. In an authentication process, when confirming that the second authentication information SUB TLV used to authenticate the second network device is not added to the UDL TLV carried in the UDL LSP, the first network device may consider that the second authentication information SUB TLV used to authenticate the second network device is not added to the UDL LSP. In this case, to ensure security, the first network device does not establish the neighbor relationship with the second network device.

In this example disclosed in the present disclosure, in an interaction process in which a first network device and a second network device perform handshake with each other, the first network device authenticates a received UDL LSP used to respond to a hello packet. When confirming that the second network device does not enable authentication, to ensure network security, the first network device does not establish a neighbor relationship with the second network device. Therefore, it is ensured that a neighbor relationship between two parties is not established when only one party enables authentication and the authentication succeeds. In this way, a problem of incomplete authentication when a neighbor between network devices is established is resolved, and security and reliability when the neighbor between the network devices is established are improved.

Example 3

Figure 9:
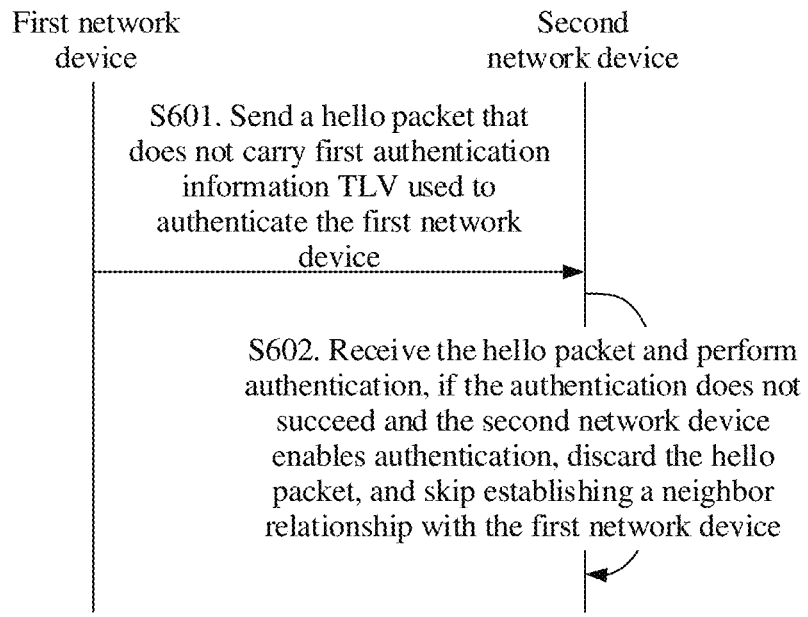
FIG. 9 is a flowchart of a neighbor establishment method according to Example 3 of the present disclosure.

When the first network device does not enable authentication, and the second network device enables authentication, a process of establishment of a neighbor between the first network device and the second network device is shown in FIG. 9, and mainly includes the following steps.

Step S601: The first network device sends, to the second network device using a first UDL, a hello packet that does not carry first authentication information TLV used to authenticate the first network device.

In a process of performing step S601, the first network device does not enable the authentication. Therefore, when the first network device sends the hello packet to the second network device using the first UDL, the hello packet does not carry the first authentication information TLV used to authenticate the first network device.

Step S602: The second network device receives, using the first UDL, the hello packet that is sent by the first network device and that does not carry the first authentication information TLV used to authenticate the first network device, performs authentication, and when not extracting the first authentication information TLV, confirms that the authentication does not succeed, and the second network device discards the hello packet that does not carry the first authentication information TLV used to authenticate the first network device, and does not establish a neighbor relationship with the first network device.

In a process of performing step S602, the second network device receives, using the first UDL, the hello packet that does not carry the first authentication information TLV used to authenticate the first network device, and authenticates the hello packet. Because the first authentication information TLV cannot be extracted, the authentication fails. It is confirmed that the authentication does not succeed. However, the second network device enables the authentication. Therefore, it is known that when one party does not enable authentication and the other party enables authentication, a neighbor relationship cannot be established. Therefore, the second network device discards the hello packet that does not carry the first authentication information TLV used to authenticate the first network device, and does not establish the neighbor relationship with the first network device.

Example 4

When neither the first network device nor the second network device enables authentication, a process of establishing a neighbor between the first network device and the second network device is as follows. When the first network device does not enable authentication, the first network device sends, to the second network device using a first UDL, a hello packet that does not carry first authentication information TLV used to authenticate the first network device, when the second network device does not enable authentication, the second network device receives, using the first UDL, the hello packet that does not carry the first authentication information TLV used to authenticate the first network device, and responds to the hello packet using a second UDL and using a UDL LSP that does carry second authentication information SUB TLV used to authenticate the second network device, and after receiving, using the second UDL, the UDL LSP that does carry the second authentication information SUB TLV used to authenticate the second network device, the first network device establishes a neighbor relationship between the first network device and the second network device.

Content disclosed in this example of the present disclosure is based on a case in which neither the first network device nor the second network device enables authentication. Because authentication is not involved in, the neighbor relationship between the two parties may be established.

With reference to the neighbor establishment method disclosed in the embodiments of the present disclosure and the examples of the present disclosure, when behavior when two parties that establish a neighbor are in a UDL scenario is stipulated, corresponding authentication information is added, according to whether a first network device and a second network device enable authentication, to packets that are sent by the first network device and the second network device to each other. The first network device sends, to the second network device using a first UDL, a hello packet that carries first authentication information TLV used to authenticate the first network device. The second network device sends an extended UDL LSP to the first network device using a second UDL, where the UDL LSP carries second authentication information SUB TLV used to authenticate the second network device. In an interaction process in which the first network device and the second network device perform handshake with each other, after receiving the extended UDL LSP, the first network device performs authentication, and when an authentication result is that both the first network device and the second network device enable authentication and the authentication succeeds, establishes a neighbor relationship between the first network device and the second network device.

According to the method disclosed in this embodiment of the present disclosure, a case in which a neighbor relationship between two parties may still be established when the two parties both enable authentication and authentication of only one party succeeds can be avoided. In this way, a problem of incomplete authentication when a neighbor between network devices is established is resolved, and security and reliability when the neighbor between the network devices is established are improved.

Based on the neighbor establishment method disclosed in the embodiments of the present disclosure, the present disclosure further correspondingly discloses network devices using the neighbor establishment method in Embodiment 1 to Embodiment 3 of the present disclosure. The network devices are used as a first network device and a second network device. The present disclosure further discloses a neighbor establishment system that includes the first network device and the second network device. In the system, a neighbor relationship between the first network device and the second network device is established based on the neighbor establishment method disclosed in the embodiments of the present disclosure, and a specific process is described in the following embodiments.

Embodiment 5

Based on Embodiment 1 of the present disclosure, this embodiment of the present disclosure correspondingly discloses a network device, used as a first network device, and mainly including a communications unit configured to send a hello packet to a second network device using a first UDL, where the hello packet carries first authentication information used to authenticate the first network device, and receive an extended UDL LSP from the second network device using a second UDL, where the extended UDL LSP is used to respond to the hello packet, when the second network device enables authentication, the extended UDL LSP carries second authentication information used to authenticate the second network device, the first UDL is a direct link from the first network device to the second network device, and the second UDL is an indirect link from the second network device to the first network device, and a processor configured to authenticate the extended UDL LSP, and when an authentication result is that both the first network device and the second network device enable authentication and the authentication succeeds, establish a neighbor relationship between the first network device and the second network device.

According to whether the first network device and the second network device enable authentication, the following situations are included.

When the communications unit receives the extended UDL LSP that is sent by the second network device and that carries the second authentication information SUB TLV used to authenticate the second network device, the processor is configured to extract, for authentication, the second authentication information SUB TLV that is carried in the extended UDL LSP and used to authenticate the second network device, and obtain the authentication result that both the first network device and the second network device enable the authentication and the authentication succeeds when the authentication is valid.

When the communications unit is configured to receive a UDL LSP from the second network device using the second UDL, where the UDL LSP is used to respond to the hello packet, and the UDL LSP does not carry the second authentication information used to authenticate the second network device, the processor is configured to authenticate the UDL LSP, and not establish the neighbor relationship with the second network device when it is not detected that the UDL LSP carries the second authentication information used to authenticate the second network device.

The first UDL is a direct link from the first network device to the second network device, and the second UDL is an indirect link from the second network device to the first network device.

Based on Embodiment 2 of the present disclosure, this embodiment of the present disclosure correspondingly discloses a network device, used as a second network device, and mainly including a communications unit configured to receive, using a first UDL, a hello packet sent by a first network device, where the hello packet carries first authentication information used to authenticate the first network device, and the first UDL is a direct link from the first network device to the second network device, and a processor configured to authenticate the hello packet that carries the first authentication information used to authenticate the first network device when the second network device enables authentication, send an extended UDL LSP to the first network device using a second UDL when the authentication succeeds, where the extended UDL LSP is used to respond to the hello packet, the extended UDL LSP carries second authentication information used to authenticate the second network device, and the first network device authenticates the extended UDL LSP, and establish a neighbor relationship with the first network device when an authentication result is that both the first network device and the second network device enable authentication and the authentication succeeds.

The second UDL is an indirect link from the second network device to the first network device.

According to whether the first network device and the second network device enable authentication and whether the authentication succeeds, the following situations are included.

When the second network device does not enable the authentication, and the communications unit configured to receive the hello packet sent by the first network device receives the hello packet that carries the first authentication information TLV used to authenticate the first network device, the processor is configured to send a UDL LSP to the first network device using the second UDL, where the UDL LSP does not carry the second authentication information used to authenticate the second network device, and the first network device authenticates the UDL LSP, and not establish the neighbor relationship with the first network device when the first network device does not detect that the UDL LSP carries the second authentication information used to authenticate the second network device.

When the communications unit configured to receive the hello packet sent by the first network device receives the hello packet that carries the first authentication information TLV used to authenticate the first network device, and the first network device enables authentication, the processor configured to authenticate the hello packet includes that the processor is configured to extract the first authentication information in the hello packet that carries the first authentication information used to authenticate the first network device, and authenticate the hello packet using the first authentication information, and confirm that the authentication succeeds when the authentication is valid, or confirm that the authentication does not succeed, and not establish the neighbor relationship with the first network device when the authentication is invalid.

When the communications unit configured to receive the hello packet sent by the first network device receives a hello packet that does not carry the first authentication information TLV used to authenticate the first network device, and the first network device does not enable authentication, the processor configured to authenticate the hello packet includes that the processor is configured to authenticate the hello packet that does not carry the first authentication information used to authenticate the first network device, and confirm that the authentication does not succeed, and discard the hello packet when not extracting the first authentication information. The extended UDL LSP is used to respond to the hello packet, the extended UDL LSP carries the second authentication information used to authenticate the second network device, and the processor that is configured to authenticate the hello packet, and when the authentication succeeds, and the second network device enables the authentication, send the extended UDL LSP to the first network device using the second UDL includes that the processor is configured to add the second authentication information to the extended UDL LSP, and send the extended UDL LSP to the first network device using the second UDL, or add the second authentication information to the extended UDL LSP in an encryption manner, and send the extended UDL LSP to the first network device using the second UDL.

It should be noted that in Embodiment 1 of the present disclosure to Embodiment 5 of the present disclosure disclosed above, a first network device sends information to a second network device using a first UDL, the second network device sends information to the first network device using a second UDL, the first UDL is a direct link from the first network device to the second network device, and the second UDL is an indirect link from the second network device to the first network device.

Embodiment 6

Figure 10:
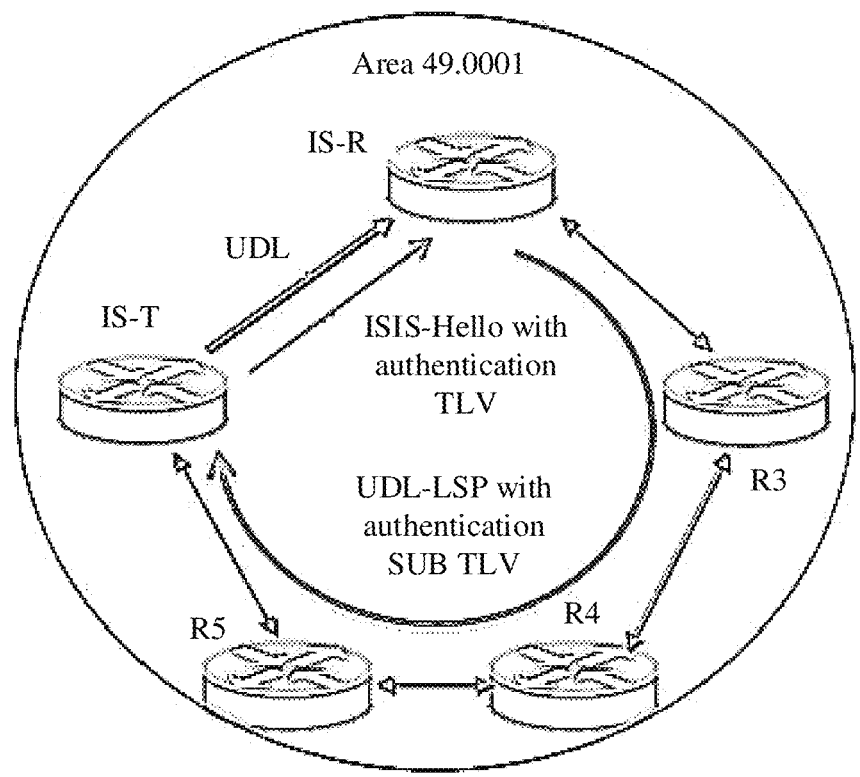
FIG. 10 is a schematic structural diagram of a neighbor establishment system according to Embodiment 6 of the present disclosure.

As shown in FIG. 10, a neighbor establishment system disclosed in this embodiment of the present disclosure mainly includes the disclosed first network device (identified as an IS-T in FIG. 10), the disclosed second network device (identified as an IS-R in FIG. 10), and a physical link connecting the first network device and the second network device. The physical link includes a first UDL from the first network device to the second network device, and a second UDL from the second network device to the first network device. The first UDL is a direct link, and the second UDL is an indirect link. Physical links R3, R4, and R5 in FIG. 10 form the second UDL from the second network device to the first network device.

The first network device is configured to send a hello packet to the second network device using the first UDL, where whether the hello packet carries authentication information TLV (i.e., ISIS-Hello with authentication TLV) used to authenticate the first network device is associated with whether the first network device enables authentication, receive an extended UDL LSP that is sent by the second network device and used to respond to the hello packet, and perform authentication, and when an authentication result is that both the first network device and the second network device enable authentication and the authentication succeeds, establish a neighbor relationship between the first network device and the second network device.

The second network device is configured to when the second network device enables authentication, authenticate the received hello packet sent by the first network device, and when the authentication succeeds, respond to the hello packet using the extended UDL LSP, where the extended UDL LSP carries second authentication information SUB TLV used to authenticate the second network device, or discard the hello packet when the authentication does not succeed.

In conclusion, according to the neighbor establishment method and system disclosed in the embodiments of the present disclosure, corresponding authentication information is added, according to whether a first network device and a second network device enable authentication, to packets that are sent by the first network device and the second network device to each other using different UDLs. Therefore, a case in which a neighbor relationship between two parties may still be established when the two parties both enable authentication and authentication of only one party succeeds can be avoided. In this way, a problem of incomplete authentication when a neighbor between network devices is established is resolved, and security and reliability when the neighbor between the network devices is established are improved.

The embodiments in this specification are all described in a progressive manner, for same or similar parts in the embodiments, reference may be made to these embodiments, and each embodiment focuses on a difference from other embodiments. The apparatus disclosed in the embodiments is described relatively simply because it corresponds to the method disclosed in the embodiments, and for portions related to those of the method, reference may be made to the description of the method. In combination with the embodiments disclosed in this specification, method or algorithm steps may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a compact disc ROM (CD-ROM), or any other form of storage medium known in the art.

The embodiments disclosed above are described to enable a person skilled in the art to implement or use the present disclosure. Various modifications to the embodiments are obvious to the person skilled in the art.

What is claimed is:

1. A neighbor relationship establishment method, comprising:
    sending, by a first network device, a hello packet to a second network device using a first unidirectional link (UDL), wherein the hello packet carries first authentication information used to authenticate the first network device, and wherein the first UDL is a direct link from the first network device to the second network device;
    receiving, by the first network device, an extended UDL link state packet (LSP) from the second network device using a second UDL, wherein the extended UDL LSP responds to the hello packet, wherein the extended UDL LSP carries second authentication information used to authenticate the second network device when authentication is enabled in the second network device, wherein the second UDL is an indirect link from the second network device to the first network device, wherein the second authentication information is of a broadcasting network and comprises a type field storing a packet type, a length field storing a packet length, an extended local circuit identifier (ID) field storing an extended local circuit ID, an authentication type field storing an authentication type, and an authentication value field storing an authentication value;
    authenticating, by the first network device, the extended UDL LSP; and
    establishing, by the first network device, a neighbor relationship with the second network device when an authentication result comprises that both the first network device and the second network device enable authentication and the authentication succeeds.

2. The method according to claim 1, wherein authenticating the extended UDL LSP comprises:
    extracting, by the first network device for authentication, the second authentication information that is carried in the extended UDL LSP and used to authenticate the second network device; and
    obtaining, by the first network device, the authentication result that both the first network device and the second network device enable the authentication and the authentication succeeds when the authentication is valid.

3. The method according to claim 1, wherein after sending the hello packet to the second network device, the method further comprises:
    receiving, by the first network device, a UDL LSP from the second network device using the second UDL when the second network device does not enable the authentication, wherein the UDL LSP responds to the hello packet, wherein the UDL LSP does not carry the second authentication information used to authenticate the second network device;
    authenticating, by the first network device, the UDL LSP; and
    skipping establishing, by the first network device, the neighbor relationship with the second network device when the UDL LSP does not carry the second authentication information used to authenticate the second network device.

4. The method according to claim 1, wherein the second authentication information is added to the extended UDL LSP in one of two manners, plaintext or ciphertext.

5. The method according to claim 1, wherein there are no nodes between the first network device and the second network device.

6. A network device, used as a first network device, comprising:
    a communications interface configured to:
        send a hello packet to a second network device using a first unidirectional link (UDL), wherein the hello packet carries first authentication information used to authenticate the first network device, and wherein the first UDL is a direct link from the first network device to the second network device; and
        receive an extended UDL link state packet (LSP) from the second network device using a second UDL when the second network device enables authentication, wherein the extended UDL LSP responds to the hello packet, wherein the extended UDL LSP carries second authentication information used to authenticate the second network device, wherein, the second UDL is an indirect link from the second network device to the first network device, wherein the second authentication information is of a broadcasting network and comprises a type field storing a packet type, a length field storing a packet length, an extended local circuit identifier (ID) field storing an extended local circuit ID, an authentication type field storing an authentication type, and an authentication value field storing an authentication value; and a processor coupled to the communications interface and configured to:

authenticate the extended UDL LSP; and establish a neighbor relationship between the first network device and the second network device when an authentication result comprises that both the first network device and the second network device enable authentication and the authentication succeeds.

7. The network device according to claim 6, wherein when authenticating the extended UDL LSP, the processor is further configured to:

extract, for authentication, the second authentication information that is carried in the extended UDL LSP and used to authenticate the second network device; and obtain the authentication result that both the first network device and the second network device enable the authentication and the authentication succeeds when the authentication is valid.

8. The network device according to claim 6, wherein when the second network device does not enable the authentication, the communications interface is further configured to receive a UDL LSP from the second network device using the second UDL, wherein the UDL LSP responds to the hello packet, wherein the UDL LSP does not carry the second authentication information used to authenticate the second network device, and wherein the processor is further configured to:

authenticate the UDL LSP; and skip establishing the neighbor relationship with the second network device when the UDL LSP does not carry the second authentication information used to authenticate the second network device.

9. The network device according to claim 6, wherein there are no nodes between the first network device and the second network device.

10. A network device, used as a second network device, comprising:

a communications interface configured to receive a hello packet from a first network device using a first unidirectional link (UDL), wherein the hello packet carries first authentication information used to authenticate the first network device, and wherein the first UDL is a direct link from the first network device to the second network device; and a processor coupled to the communications interface and configured to:

authenticate the hello packet that carries the first authentication information used to authenticate the first network device when the second network device enables authentication;

send an extended UDL link state packet (LSP) to the first network device using a UDL when the authentication succeeds, wherein the extended UDL LSP responds to the hello packet, wherein the extended UDL LSP carries second authentication information used to authenticate the second network device, wherein the second authentication information is of a broadcasting network and comprises a type field storing a packet type, a length field storing a packet length, an extended local circuit identifier (ID) field storing an extended local circuit ID, an authentication type field storing an authentication type, and an authentication value field storing an authentication value; and establish a neighbor relationship with the first network device when an authentication result comprises that both the first network device and the second network device enable authentication and the authentication succeeds, wherein the second UDL is an indirect link from the second network device to the first network device.

11. The network device according to claim 10, wherein when the second network device does not enable the authentication, the processor is further configured to:

send a UDL LSP to the first network device using the second UDL, wherein the UDL LSP does not carry the second authentication information used to authenticate the second network device; and skip establishing the neighbor relationship with the first network device when the UDL LSP does not carry the second authentication information used to authenticate the second network device.

12. The network device according to claim 10, wherein when authenticating the hello packet, the processor is further configured to:

extract the first authentication information in the hello packet that carries the first authentication information used to authenticate the first network device;

authenticate the hello packet using the first authentication information; and determine that the authentication succeeds when the authentication is valid.

13. The network device according to claim 10, wherein when authenticating the hello packet, the processor is further configured to:

extract the first authentication information in the hello packet that carries the first authentication information used to authenticate the first network device;

authenticate the hello packet using the first authentication information; and determine that the authentication does not succeed, and skip establishing the neighbor relationship with the first network device when the authentication is invalid.

14. The network device according to claim 10, wherein when the second network device enables authentication and the first network device does not enable authentication, the communications interface is further configured to receive, using the first UDL, the hello packet from the first network device, wherein the hello packet does not carry the first authentication information used to authenticate the first network device, wherein the first UDL comprises the direct link from the first network device to the second network device, and wherein the processor is further configured to:

authenticate the hello packet that does not carry the first authentication information used to authenticate the first network device; and determine that the authentication does not succeed, and discard the hello packet when not extracting the first authentication information.

15. The network device according to claim 10, wherein when sending the extended UDL LSP to the first network device using the second UDL, the processor is further configured to:

add the second authentication information to the extended UDL LSP; and send the extended UDL LSP to the first network device using the second UDL.

16. The network device according to claim 10, wherein when sending the extended UDL LSP to the first network device using the second UDL, the processor is further configured to:

add the second authentication information to the extended UDL LSP in an encryption manner; and send the extended UDL LSP to the first network device using the second UDL.

17. The network device according to claim 10, wherein the second authentication information is added to the extended UDL LSP in one of two manners, plaintext or ciphertext.

18. The network device according to claim 10, wherein there are no nodes between the first network device and the second network device.

* * * * *